(12) United States Patent
He et al.

(10) Patent No.: US 10,812,635 B2
(45) Date of Patent: Oct. 20, 2020

(54) FOLDABLE MOBILE TERMINAL

(71) Applicants: GREE ELECTRIC APPLIANCES (WUHAN) CO., LTD., Wuhan (CN); GREE ELECTRIC APPLIANCES, INC. OF ZHUHAI, Zhuhai (CN)

(72) Inventors: Sheng He, Zhuhai (CN); Xianggen He, Zhuhai (CN)

(73) Assignee: GREE ELECTRIC APPLIANCES (WUHAN) CO., LTD., Wuhan (CN)

( * ) Notice: Subject to any disclaimer, the term of this patent is extended or adjusted under 35 U.S.C. 154(b) by 0 days.

(21) Appl. No.: 16/619,694

(22) PCT Filed: Jun. 15, 2018

(86) PCT No.: PCT/CN2018/091596
§ 371 (c)(1),
(2) Date: Dec. 5, 2019

(87) PCT Pub. No.: WO2019/041974
PCT Pub. Date: Mar. 7, 2019

(65) Prior Publication Data
US 2020/0186629 A1    Jun. 11, 2020

(30) Foreign Application Priority Data
Aug. 31, 2017 (CN) .......................... 2017 1 0771302

(51) Int. Cl.
*H04M 1/00* (2006.01)
*H01Q 1/22* (2006.01)
(Continued)

(52) U.S. Cl.
CPC .......... *H04M 1/0216* (2013.01); *H01Q 1/243* (2013.01); *H01Q 1/36* (2013.01); *H04M 1/0268* (2013.01)

(58) Field of Classification Search
CPC .... H04M 1/00; H04M 1/0202; H04M 1/0214; H04M 1/0216; H04M 1/0235;
(Continued)

(56) References Cited

U.S. PATENT DOCUMENTS 7,290,718 B2 * 11/2007 Sekita ................ H04M 1/0212
455/550.1
7,403,164 B2 * 7/2008 Sanz ...................... H01Q 1/243
343/700 MS
(Continued)

FOREIGN PATENT DOCUMENTS

CN      1783739 A     6/2006
CN    201191643 Y     2/2009
(Continued)

OTHER PUBLICATIONS

International Search Report for International Application No. PCT/CN2018/091596, dated Sep. 10, 2018, 3 pages.

*Primary Examiner* — Quochien B Vuong
(74) *Attorney, Agent, or Firm* — Armstrong Teasdale LLP

(57) ABSTRACT

Some embodiments of the present disclosure relates to the technical field of mobile terminals, and particularly discloses a foldable mobile terminal. The foldable mobile terminal includes: an upper antenna and a lower antenna; and a first contact and a second contact. The first contact is connected to the upper antenna, and the second contact is connected to the lower antenna and is used for touching the first contact. In a case that the foldable mobile terminal is folded so that the first contact and the second contact touch each other, the upper antenna and the lower antenna form a new antenna.

12 Claims, 3 Drawing Sheets

(51) Int. Cl.
*H04M 1/02* (2006.01)
*H01Q 1/24* (2006.01)
*H01Q 1/36* (2006.01)

(58) Field of Classification Search
CPC .. H04M 1/0245; H04M 1/0247; H04M 1/026; H04M 1/0268; H04B 1/38; H01Q 1/36; H01Q 1/243; H01Q 3/01; H01Q 3/247; H01Q 5/00; H01Q 5/30; H01Q 5/48; H01Q 5/50; H01Q 5/321; H01Q 9/26; H01Q 9/42; H01Q 21/28; H01Q 21/30; H01Q 25/00
See application file for complete search history.

(56) References Cited

U.S. PATENT DOCUMENTS

| | | | | |
|---|---|---|---|---|
| 7,539,527 | B2* | 5/2009 | Jang | H01Q 1/242 |
| | | | | 455/272 |
| 8,749,443 | B2* | 6/2014 | Hashizume | H01Q 1/243 |
| | | | | 343/853 |
| 8,754,815 | B2* | 6/2014 | Leem | H01Q 1/243 |
| | | | | 343/702 |
| 8,854,276 | B2* | 10/2014 | Koyama | H01Q 1/24 |
| | | | | 343/876 |
| 9,240,829 | B2* | 1/2016 | Hasegawa | H04B 7/0608 |
| 2008/0032756 | A1 | 2/2008 | Kanazawa et al. | |

FOREIGN PATENT DOCUMENTS

| | | |
|---|---|---|
| CN | 204763922 U | 11/2015 |
| CN | 106788575 A | 5/2017 |

* cited by examiner

FOLDABLE MOBILE TERMINAL

CROSS REFERENCE TO RELATED APPLICATIONS

This application is the national stage entry of PCT/CN2018/091596, filed on Jun. 15, 2018, entitled "Foldable Mobile Terminal," which claims priority of Chinese Patent Application No. 201710771302.2, filed on Aug. 31, 2017, entitled "Foldable Mobile Terminal", the contents of which are hereby incorporated by reference in their entirety.

TECHNICAL FIELD

The embodiments of the present disclosure relate to the technical field of mobile terminals, and particularly to a foldable mobile terminal.

BACKGROUND

With the rapid development of science and technology and the national economy, people have more and more functional requirements for mobile terminals, so functional applications on the mobile terminals have become more diverse, in order to meet the demands of users for size-adjustable screens or bodies of mobile terminals, foldable mobile terminals have emerged.

However, in the process of implementing the present disclosure, the inventors of the present disclosure found that the a method has the following problems: since most of the foldable mobile terminals are provided with upper and lower antennas, when one of the foldable mobile terminals is folded, the upper and lower antenna areas are close, so that the surrounding environment of the antennas changes, which has a great influence on the performance of the antennas and in turn affects the signal quality of a mobile phone.

SUMMARY

Some embodiments of the present disclosure adopt the following technical solution: a foldable mobile terminal is provided, which includes:

an upper antenna and a lower antenna.

In a case that the foldable mobile terminal is folded, the upper antenna and the lower antenna are electrically connected to form a new antenna.

Optionally, the foldable mobile terminal further includes:
a first contact, connected to the upper antenna; and
a second contact, connected to the lower antenna and configured to touch the first contact, wherein in the case that the foldable mobile terminal is folded so that the first contact and the second contact touch each other, the upper antenna and the lower antenna form the new antenna.

Optionally, the foldable mobile terminal further includes:
a radio frequency module;
a switch, connected to the upper antenna and the lower antenna; and
a processor, connected to the switch, and configured to control, when the first contact and the second contact touch each other, an on-off of the switch to implement switching between the upper antenna, the lower antenna and the new antenna, and configured to compare signal transmission performance of the upper antenna, signal transmission performance of the lower antenna and signal transmission performance of the new antenna, and select an antenna with the best signal transmission performance from the upper antenna, the lower antenna and the new antenna as a first available antenna in a case that the foldable mobile terminal is in a folded state.

Optionally, the switch includes a first switch, a second switch and a third switch.

The radio frequency module is connected to the upper antenna through the first switch, and the radio frequency module is connected to the lower antenna through the second switch.

The upper antenna is connected to the first contact through the third switch.

The processor is connected to the first switch, the second switch and the third switch, and controls an on-off of the first switch, an on-off of the second switch and an on-off of the third switch.

The foldable mobile terminal further includes a detection unit, and in a case that the new antenna is selected as the first available antenna, the detection unit detects an environment state where the foldable mobile terminal is located.

The processor is configured to select the first contact matching the environment state, turn on the third switch corresponding to the selected first contact, and turn off remaining third switches.

Optionally, the foldable mobile terminal further includes: a second available antenna and a fourth switch.

The second available antenna is connected to the radio frequency module through the fourth switch, the processor is configured to turn off the fourth switch when the first contact does not touch the second contact, and turn on the fourth switch when the first contact touches the second contact.

Optionally, the foldable mobile terminal further includes:
a flexible screen and a hinge, where the hinge is arranged in the middle of a back of the foldable mobile terminal, the flexible screen is arranged on a front of the foldable mobile terminal, and the hinge is taken as a axis to fold the foldable mobile terminal to make the flexible screen divided into a first screen and a second screen.

The processor is configured to turn off the second screen, when the first contact touches the second contact.

Optionally, the first screen and the second screen have the same display area.

Optionally, the foldable mobile terminal further includes:
a sensing module, configured to acquire touch information of the first contact and the second contact, and transmit the touch information to the processor.

Optionally, the first contact is a bulge member, the second contact is a groove, the bulge member matches the groove, and in the case that the foldable mobile terminal is folded so that the first contact and the second contact touch each other, the first contact and the second contact are fixed by mosaic.

BRIEF DESCRIPTION OF THE DRAWINGS

The one or more embodiments are exemplified by the pictures in the corresponding accompanying drawings, and the exemplary descriptions do not constitute a limitation to the embodiments. Elements in the drawings having the same reference numerals are denoted by like elements, and unless otherwise stated, the figures in the drawings do not constitute a proportional limitation.

DETAILED DESCRIPTION OF THE EMBODIMENTS

In order to facilitate the understanding of the present disclosure, the present disclosure will be described in more detail below with reference to the accompanying drawings and specific embodiments. It is to be noted that when an element is described as being "fixed" to another element, it may be directly on the other element, or one or more central elements may be present there between. When an element is described as being "connected" to another element, it may be directly connected to the other element, or one or more central elements may be present there between. The terms "vertical," "horizontal," "left," "right," and the like, as used in this specification, are for the purpose of illustration.

Unless otherwise defined, all technical and scientific terms used in this specification have the same meaning as commonly understood by those skilled in the art. The terms used in the specification of the present disclosure are for the purpose of describing the specific embodiments, and are not intended to limit the present disclosure. The term "and/or" used in this specification includes any and all combinations of one or more of the associated listed items.

Figure 1:
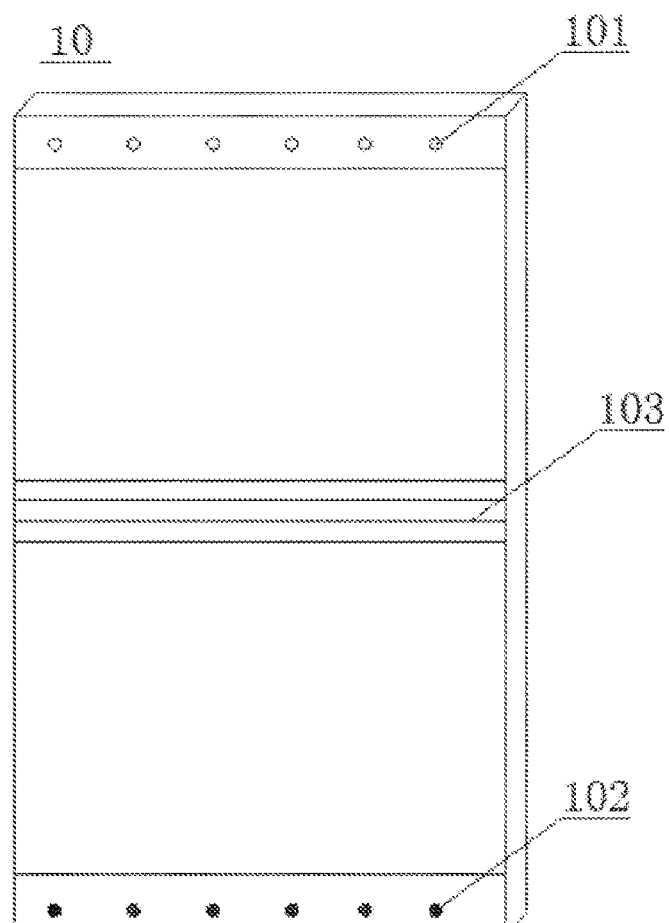
FIG. 1 is a rear three-dimensional view of an embodiment of a foldable mobile terminal of the present disclosure.
Figure 2:
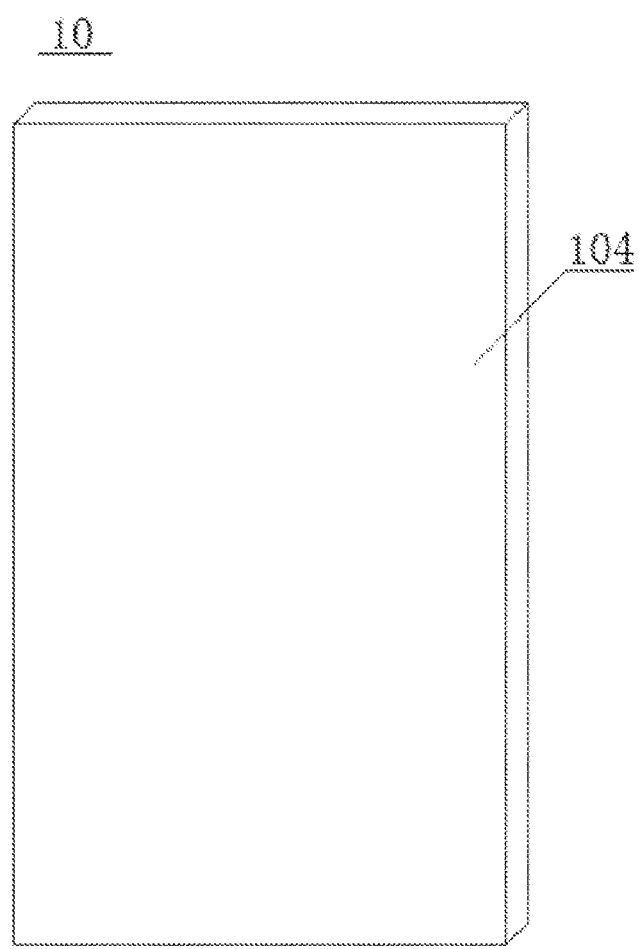
FIG. 2 is a front three-dimensional view of an embodiment of a foldable mobile terminal of the present disclosure.
Figure 3:
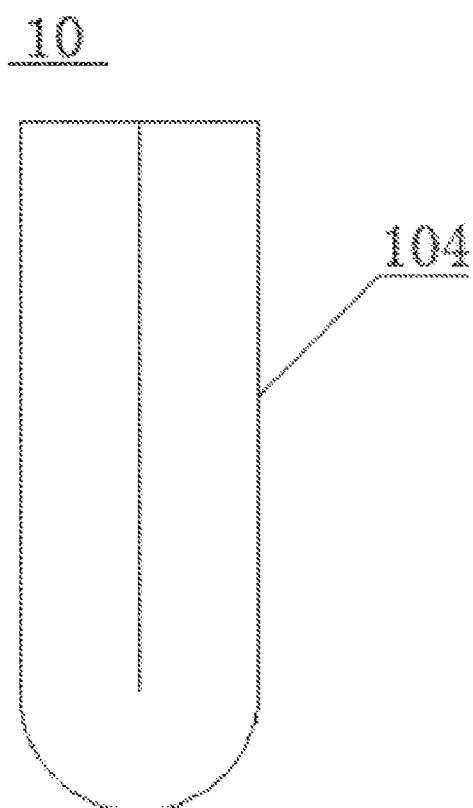
FIG. 3 is a folding schematic view of an embodiment of a foldable mobile terminal of the present disclosure.
Figure 4:
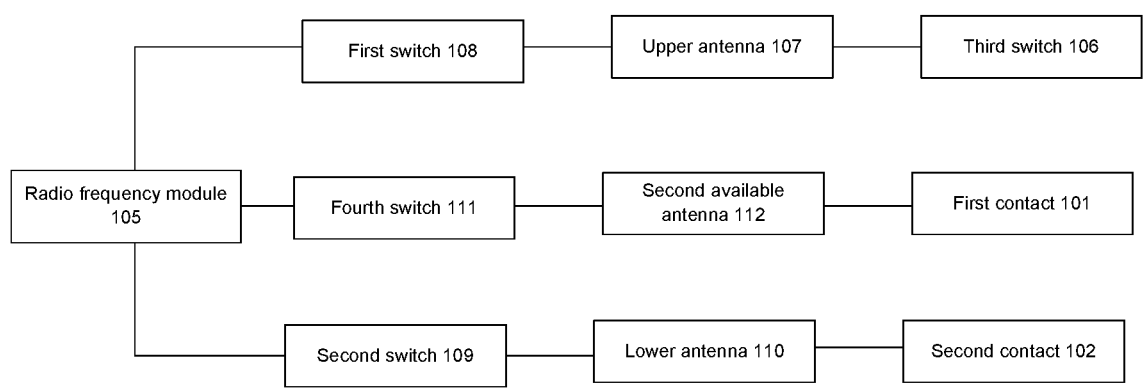
FIG. 4 is a partial structural schematic view of an embodiment of a foldable mobile terminal of the present disclosure.

Referring to FIG. 1 to FIG. 4, a foldable mobile terminal 10 according to some embodiments of the present disclosure includes:

an upper antenna 107 and a lower antenna 110.

In a case that the foldable mobile terminal 10 is folded, the upper antenna 107 and the lower antenna 110 are electrically connected to form a new antenna (not shown).

Before the foldable mobile terminal 10 known to the inventors is folded, the upper antenna 107 and the lower antenna 110 have a certain clearance area. In the case that the foldable mobile terminal 10 is folded, the upper antenna 107 and the lower antenna 110 are very close to each other, and the upper antenna and the lower antenna 110 will interfere with each other to cause communication performance degradation. In some embodiments of the present disclosure, after the foldable mobile terminal 10 is folded, the upper antenna 107 and the lower antenna 110 touch each other and are electrically connected to form the new antenna. The performance of the new antenna in the folding environment is good, the communication function of the foldable mobile terminal 10 is prevented from being affected by mutual interference between the upper antenna 107 and the lower antenna 110, and it is ensured that a user may still obtain good call experiences and online experiences after the foldable mobile terminal 10 is folded.

Optionally, in order to make the antenna design of the foldable mobile terminal 10 more reasonable, and to prevent the upper antenna and the lower antenna from being directly exposed to the outside of the foldable mobile terminal 10 as much as possible, the foldable mobile terminal further includes:

a first contact 101, connected to the upper antenna 107; and a second contact 102, connected to the lower antenna 110 and configured to touch the first contact 101, in the case that the foldable mobile terminal 10 is folded so that the first contact 101 and the second contact 102 touch each other, the upper antenna 107 and the lower antenna 110 form the new antenna.

Optionally, in order to enable the foldable mobile terminal 10 to use an antenna with the best communication performance in a case that the foldable mobile terminal 10 is in an unfolded or a folded state, the foldable mobile terminal 10 further includes:

a radio frequency module 105, configured to output a radio frequency signal;

a switch (not shown), connected to the upper antenna 107 and the lower antenna 110; and a processor (not shown), connected to the switch, and configured to control, when the first contact 101 and the second contact 102 touch each other, an on-off of the switch to implement switching between the upper antenna 107, the lower antenna 110 and the new antenna, and configured to compare signal transmission performance of the upper antenna 107, signal transmission performance of the lower antenna 110 and signal transmission performance of the new antenna, and select an antenna with the best signal transmission performance from the upper antenna 107, the lower antenna 110 and the new antenna as a first available antenna in a case that the foldable mobile terminal 10 is in the folded state.

Optionally, the switch includes a first switch 108, a second switch 109 and a third switch 106.

The radio frequency module 105 is connected to the upper antenna 107 through the first switch 108, and the radio frequency module 105 is connected to the lower antenna 110 through the second switch 109.

The upper antenna 107 is connected to the first contact 101 through the third switch 106.

The processor is connected to the first switch 108, the second switch 109 and the third switch 106, and controls an on-off of the first switch 108, an on-off of the second switch 109 and an on-off of the third switch 106.

When the first contact 101 does not touch the second contact 102, that is, in the case that the foldable mobile terminal 10 is not folded, the processor is configured to compare the signal transmission performance of the upper antenna 107 and the signal transmission performance of the lower antenna 110, and select the antenna with the best signal transmission performance from the upper antenna 107 and the lower antenna 110 as the first available antenna of the foldable mobile terminal 10 in the unfolded state.

Optionally, the processor compares the signal transmission performance of the upper antenna 107 and the signal transmission performance of the lower antenna 110 in two cases. In the first case, the processor turns on the first switch 108, turns off the second switch 109, and tests the signal transmission performance of the upper antenna by sending a test communication signal to a base station and then receiving a response signal returned by the base station. In the second case, the processor turns off the first switch 108, turns on the second switch 109, and tests the signal transmission performance of the lower antenna by sending a test communication signal to the base station and then receiving a response signal returned by the base station. The processor further determines the antenna with the best signal transmission performance according to the above two cases, and uses the antenna with the best signal transmission performance as an available antenna of the foldable mobile terminal 10 in the unfolded state, thereby allowing the foldable mobile terminal 10 to use the antenna with the best communication performance in the case that it is not folded.

When the first contact 101 touches the second contact 102, the processor is configured to compare the signal transmission performance of the upper antenna 107, the signal transmission performance of the lower antenna 110 and the signal transmission performance of the new antenna, and select the antenna with the best signal transmission performance from the upper antenna 107, the lower antenna 110 and the new antenna as the first available antenna of the foldable mobile terminal 10 in the folded state. Optionally, the processor compares the signal transmission performance of the upper antenna 107, the signal transmission performance of the lower antenna 110 and the signal transmission performance of the new antenna in three cases. In the first case, the processor turns on the third switch 106, the first switch 108 and the second switch 109, and tests the signal transmission performance of the new antenna by sending a test communication signal to the base station and then receiving a response signal returned by the base station. In the second case, the processor turns on the third switch 106 and the first switch 108, turns off the second switch 109 such that the radio frequency module 105 of the foldable mobile terminal directly transmits a signal through the upper antenna 107, and tests the signal transmission performance of the upper antenna 107 by sending a test communication signal to the base station and then receiving a response signal returned by the base station. In the third case, the processor turns on the second switch 109, turns off the third switch 106 and the first switch 108 such that the radio frequency module 105 of the foldable mobile terminal directly transmits a signal through the lower antenna 110, and tests the signal transmission performance of the lower antenna 110 by sending a test communication signal to the base station and then receiving a response signal returned by the base station. The processor further determines the antenna with the best signal transmission performance according to the above three cases, and uses the antenna with the best signal transmission performance as the first available antenna of the foldable mobile terminal 10 in the folded state, thereby allowing the foldable mobile terminal 10 to use the antenna with the best communication performance in the case that it is folded. Optionally, the signal transmission performances can be compared by comparing packet losses of the received response signals. Optionally, a switch is also arranged between the second contact 102 and the lower antenna 110, and the switch is also controlled to be turned on or off by the processor to ensure more precise control of the connection between the upper antenna and the lower antenna.

Further, in some embodiments of the present disclosure, in a case that there are multiple first contacts 101 and multiple third switches 106, one first contact 101 corresponds to one third switch 106.

The foldable mobile terminal 10 further includes a detection unit (not shown), and in a case that the new antenna is selected as the first available antenna, the detection unit detects an environment state where the foldable mobile terminal 10 is located.

The processor is configured to select the first contact 101 matching the environment state, turn on the third switch 106 corresponding to the selected first contact 101, and turn off remaining third switches 106. Optionally, the environment state is determined by a current usage state of the foldable mobile terminal 10. For example, a lower end of the foldable mobile terminal 10 held by a user is in a first environment state, and an upper end of the foldable mobile terminal 10 held by the user or an upper end of the foldable mobile terminal 10 touched by the head of the user is in a second environment state. When designing the respective contacts of the new antenna, the optimal contact in various environment states is preset, and therefore, when the detection unit detects the environment state of the foldable mobile terminal 10, the first contact 101 in the preset corresponding environment state is selected first, the third switch 106 corresponding to the selected first contact 101 is turned on, and the remaining third switches 106 are turned off. Thus, it is ensured that the signal transmission performance of the new antenna selected by the foldable mobile terminal 10 is optimal under various preset environment states.

Further, in order to make the upper end of the foldable mobile terminal 10 and the lower end of the foldable mobile terminal 10 still have the antennas after the foldable mobile terminal 10 is folded such that the foldable mobile terminal 10 can select the best communication antenna to the greatest freedom, the foldable mobile terminal 10 further includes: a second available antenna 112 and a fourth switch 111.

The second available antenna 112 is connected to the radio frequency module 105 through the fourth switch 111, where the processor is configured to turn off the fourth switch 111 when the first contact 101 does not touch the second contact 102, and turn on the fourth switch 111 when the first contact 101 touches the second contact 102. Further, when the first contact 101 does not touch the second contact 102, that is, in the case that the foldable mobile terminal 10 is not folded, the second available antenna 112 does not work to save power of the mobile terminal; and when the first contact 101 touches the second contact 102, that is, in the case that the foldable mobile terminal 10 is folded, the second available antenna 112 works to serve as the lower antenna of the foldable mobile terminal 10 at this time, thereby ensuring that the foldable mobile terminal 10 has the best signal transmission function.

In some embodiments of the present disclosure, in order to implement the folding function of the foldable mobile terminal 10, the foldable mobile terminal 10 further includes: a flexible screen 104 and a hinge 103, where the hinge 103 is arranged in the middle of a back of the foldable mobile terminal 10, the flexible screen 104 is arranged on a front of the foldable mobile terminal 10, and the hinge 103 is taken as a axis to fold the foldable mobile terminal 10 to make the flexible screen 104 divided into a first screen (not shown) and a second screen (not shown).

When the first contact 101 touches the second contact 102, the processor is configured to close the second screen. It is to be noted that the first screen and the second screen are both part of the flexible screen, but the first screen and the second screen are separately controlled by the processor to ensure that after the foldable mobile terminal 10 is folded, the processor can individually turn on the first screen and turn off the second screen.

Optionally, the first screen and the second screen have the same display area, so that the foldable mobile terminal 10 can maintain the screen symmetry and can be more attractive after being folded.

Further, the foldable mobile terminal 10 further includes a sensing module.

The sensing module (not shown) is configured to acquire touch information of the first contact 101 and the second contact 102, and transmit the touch information to the processor. The touch information includes the first contact 101 touching the second contact 102 or the first contact 101 not touching the second contact 102. Optionally, the sensing module is composed of a sensing circuit that is connected to the first contact 101 and the second contact 102 respectively, when the first contact 101 touches the second contact 102, the sensing circuit generates a sensing current to determine that the first contact 101 touches the second contact 102. Conversely, the sensing circuit does not generate the sensing current, and the first contact 101 does not touch the second contact 102.

Further, in order to make the first contact 101 and the second contact 102 more tightly fixed together, the first contact 101 is a bulge member, the second contact 102 is a groove, the bulge member matches the groove, and in the case that the foldable mobile terminal 10 is folded so that the first contact 101 and the second contact 102 touch each other, the first contact 101 and the second contact 102 are fixed by mosaic. Optionally, the bulge member is a cylinder, the groove is a cylindrical groove, and the diameter of the cylinder is equal to the diameter of the cylindrical groove. Optionally, the diameter of the cylinder is slightly larger than the diameter of the cylindrical groove and the cylindrical groove can be elastically deformed to ensure that the cylinder and the cylindrical groove are more precisely inlaid. Optionally, in order to make a better electrical connection between the first contact 101 and the second contact 102, the cylinder and the cylindrical groove are made of copper.

It is to be noted that after the foldable mobile terminal 10 is folded and the new antenna with the best communication performance is selected, the new antenna will automatically be biased toward the important frequency band of call and data transmission.

In some embodiments of the present disclosure, after the foldable mobile terminal 10 is folded, the upper antenna 107 and the lower antenna 110 touch each other and are electrically connected to form the new antenna. The performance of the new antenna in the folding environment is good, the communication function of the foldable mobile terminal 10 is prevented from being affected by mutual interference between the upper antenna 107 and the lower antenna 110, and it is ensured that the user may still obtain good call experiences and online experiences after the foldable mobile terminal 10 is folded. Further, the foldable mobile terminal 10 also selects the antenna with the best communication performance from the upper antenna 107, the lower antenna 110 and the new antenna after being folded as the first available antenna, and in case that the new antenna is selected as the first available antenna, the best contact is also selected for connection to ensure optimal communication performance. In addition, some embodiments of the present disclosure also provides a tight fixing method to ensure that the structure of the foldable mobile terminal 10 after being folded is more firmer.

The above description is only some embodiments of the present disclosure, and thus does not limit the patent scope of the present disclosure. The equivalent structure or equivalent process transformations made by the present specification and the contents of the drawings, or directly or indirectly applied to other related technical fields, are all included in the scope of patent protection of the present disclosure.

What is claimed is:

1. A foldable mobile terminal, comprising:
   an upper antenna and a lower antenna, wherein
   in a case that the foldable mobile terminal is folded, the upper antenna and the lower antenna are electrically connected to form a new antenna.

2. The foldable mobile terminal according to claim 1, further comprising:
   a first contact, connected to the upper antenna; and
   a second contact, connected to the lower antenna and configured to touch the first contact, wherein in the case that the foldable mobile terminal is folded so that the first contact and the second contact touch each other, the upper antenna and the lower antenna form the new antenna.

3. The foldable mobile terminal according to claim 2, further comprising:
   a radio frequency module;
   a switch, connected to the upper antenna and the lower antenna; and
   a processor, connected to the switch, and configured to control, when the first contact and the second contact touch each other, an on-off of the switch to implement switching between the upper antenna, the lower antenna and the new antenna, and configured to compare signal transmission performance of the upper antenna, signal transmission performance of the lower antenna and signal transmission performance of the new antenna, and select an antenna with the best signal transmission performance from the upper antenna, the lower antenna and the new antenna as a first available antenna in a case that the foldable mobile terminal is in a folded state.

4. The foldable mobile terminal according to claim 3, wherein the switch comprises a first switch, a second switch and a third switch;
   the radio frequency module is connected to the upper antenna through the first switch, the radio frequency module is connected to the lower antenna through the second switch, and the upper antenna is connected to the first contact through the third switch; and
   the processor is connected to the first switch, the second switch and the third switch, and controls an on-off of the first switch, an on-off of the second switch and an on-off of the third switch.

5. The foldable mobile terminal according to claim 4, wherein
   in a case that there are a plurality of first contacts and a plurality of third switches, one first contact corresponds to one third switch;
   the foldable mobile terminal further comprises a detection unit, and in a case that the new antenna is selected as the first available antenna, the detection unit detects an environment state where the foldable mobile terminal is located; and
   the processor is configured to select the first contact matching the environment state, turn on the third switch corresponding to the selected first contact, and turn off remaining third switches.

6. The foldable mobile terminal according to claim 5, further comprising: a second available antenna and a fourth switch, wherein
   the second available antenna is connected to the radio frequency module through the fourth switch, the processor being configured to turn off the fourth switch when the first contact does not touch the second contact, and turn on the fourth switch when the first contact touches the second contact.

7. The foldable mobile terminal according to claim 4, further comprising: a second available antenna and a fourth switch, wherein
   the second available antenna is connected to the radio frequency module through the fourth switch, the processor being configured to turn off the fourth switch when the first contact does not touch the second contact, and turn on the fourth switch when the first contact touches the second contact.

8. The foldable mobile terminal according to claim 3, further comprising: a second available antenna and a fourth switch, wherein
   the second available antenna is connected to the radio frequency module through the fourth switch;

the processor is configured to turn off the fourth switch when the first contact does not touch the second contact, and turn on the fourth switch when the first contact touches the second contact.

9. The foldable mobile terminal according to claim 2, further comprising:
   a flexible screen and a hinge, wherein the hinge is arranged in the middle of a back of the foldable mobile terminal, the flexible screen is arranged on a front of the foldable mobile terminal, and the hinge is taken as a axis to fold the foldable mobile terminal to make the flexible screen divided into a first screen and a second screen; and
   the processor is configured to turn off the second screen when the first contact touches the second contact.

10. The foldable mobile terminal according to claim 9, wherein
   the first screen and the second screen have the same display area.

11. The foldable mobile terminal according to claim 2, further comprising:
   a sensing module, configured to acquire touch information of the first contact and the second contact, and transmit the touch information to the processor.

12. The foldable mobile terminal according to claim 2, wherein
   the first contact is a bulge member, the second contact is a groove, the bulge member matches the groove, and in the case that the foldable mobile terminal is folded so that the first contact and the second contact touch each other, the first contact and the second contact are fixed by mosaic.

* * * * *

UNITED STATES PATENT AND TRADEMARK OFFICE
CERTIFICATE OF CORRECTION

PATENT NO. : 10,812,635 B2
APPLICATION NO. : 16/619694
DATED : October 20, 2020
INVENTOR(S) : Sheng He et al.

Page 1 of 1

It is certified that error appears in the above-identified patent and that said Letters Patent is hereby corrected as shown below:

On the Title Page

Item (73), in Assignee, add -- GREE ELECTRIC APPLIANCES, INC. OF ZHUHAI --

Signed and Sealed this
Twenty-sixth Day of April, 2022

Katherine Kelly Vidal
*Director of the United States Patent and Trademark Office*